Patented Oct. 5, 1937

2,094,609

UNITED STATES PATENT OFFICE 2,094,609

HYDROTROPIC MATERIAL AND METHOD OF MAKING SAME

Wolf Kritchevsky, Chicago, Ill.

No Drawing. Application June 8, 1936,
Serial No. 84,229

22 Claims. (Cl. 260—124)

My invention relates to a new class of hydrotropic fatty substances and method of producing the same.

It is known that a number of useful compounds can be prepared by condensing higher fatty acids and other organic carboxylic acids with alkylolamines in which the ratio of acid to the alkylolamine is one or more. Such compounds have been made before, and in each case there is at least one mole of acid for each mol. of alkylolamine. Compounds of the character mentioned have a number of useful properties.

The principal object of my present invention is to form new and improved chemical substances of the general character outlined below.

Another object is to form condensation products of organic carboxylic acids such as fatty acids, particularly higher fatty acids, alkylolamines, and amines, which will have effective properties in either acid or alkali media.

Another object is to produce a series of hydrophillic compounds or water dispersible compounds of the class sometimes referred to as hydrotropic compounds.

I have discovered that if one mol. of an organic acid, particularly monobasic carboxylic acids such as the fatty acids, and more particularly the higher fatty acids, is condensed with at least one mol. of alkylolamine, together with one or more mols of an alkylolamine, arylamine, or aralkylamine, a condensation product is obtained which is readily dispersible in water and which possesses many useful properties in either neutral, alkali or acid media. The resulting substances are dispersible and will retain their effectiveness in the presence of calcium and/or magnesium salts.

In forming my improved substances, while the condensation may take place at temperatures slightly below 100° C., for appreciable results the temperature should preferably be above 100° C. Condensations have been successfully carried out as high as 250° C. It may be stated that the temperature range should be high enough to obtain appreciable speed of reaction but should not be high enough to cause decomposition of the resulting product. I have found that for practical purposes, the best temperatures are between about 135° C. and 210° C. for most of the substances coming within the class of my invention. The time required for reaction may be as long as twenty hours or more at the lowest temperatures and as short as fifteen minutes at the higher temperatures.

Condensations may be made in neutral solutions or with the aid of condensing agents of either alkaline or acid character. The nature of the condensing agent has an effect upon the speed of reaction and temperature required. Although I have used several different condensing agents for experimental purposes, I have found that excellent products are obtained without the use of any condensing agents.

Compounds or substances are obtained having a variety of properties depending, among other things, upon the character of the carboxylic acid or the like, alkylolamine, and amine employed. Substances having good technical properties may be prepared by the use of lower molecular weight aliphatic carboxylic acids such as the lower fatty acids including acetic acid, propionic acid, butyric acid, and other similar acids having up to six carbon atoms in the molecule. For my most effective results, however, I prefer to use the aliphatic monocarboxylic acids, such as the fatty acids, having at least six carbon atoms, and, more particularly, those containing from twelve to eighteen carbon atoms. The condensation products prepared by the use of these latter mentioned acids, or higher molecular weight acids, are clearly differentiated in at least many of their properties and uses from the products prepared from the lower molecular weight aliphatic monocarboxylic acids. It will be understood that wherever I use the term "higher molecular weight aliphatic monocarboxylic acid" or the term "higher fatty acid", I intend to cover such acids having a chain of at least six carbon atoms. Aside from the acids mentioned above, the most preferred of which are derived from the naturally occurring animal and vegetable triglyceride oils and fats, hydrogenated or not, I may employ fatty acids, derived from waxes, having as high as thirty-five carbon atoms or more. Examples of suitable fatty acids are stearic acid, palmitic acid, oleic acid, linoleic acid, lauric acid, myristic acid, coconut oil fatty acids, ricinoleic acid, hexanoic acid, butanoic acid, and others such as the wax fatty acids.

The invention is not limited to the use of the fatty acids but other monobasic acids can also be used including aromatic acids such as benzoic acid, naphthoic acid, and hydroaromatic acids like abietic acid. I may use cyclic acids, of the type of naphthenic acid, and heterocyclic acids like quinaldine carboxylic acid. I may also employ polycarboxylic acids such as sebacic acid, phthalic acid, citric acid, adipic acid, japanic acid, tartaric acid, and other polycarboxylic acids of aliphatic, aromatic, hydroaromatic, alicyclic and heterocyclic character.

Derivatives of any of the acids mentioned above may also be employed such as sulphonic acid, halogen, and nitro derivatives.

It is not necessary to secure adequate results to use the free fatty acids, but I can also use fats as a source of fatty acid, in which case glycerine or other alcohol forming the fatty ester splits off during the condensation. In place of the fats, I may also use sulphuric acid esters of fats, like sulphonated castor oil, as well as the substitution products thereof such as the halogenous substitution products, for example, chlorinated olein. I may also use the acid halides, such as stearyl chloride, but in this latter case, lower temperatures must be used for the condensation. I may also use amides of fatty acids, and their alkylol derivatives. As a source of fatty acids, I may also employ acid anhydrides. In general, any organic acid derivative containing a —CO— group may be used. It is obvious to the skilled chemist that when employing ordinary glyceride esters as a source of fatty acid, the number of equivalents of fatty acid must be taken into consideration so that not substantially more than one mol. of fatty acid is present for two mols or more of the alkylolamine.

The amines may likewise be of diverse character. Among those which may be employed are alkylamines such as butylamine, dimethylamine, ethylene diamine, diethylene triamine, triethylene-tetramine, mono-methyl ethylene diamine, 1-1 dimethyl ethylene diamine, mono-ethyl diethylene triamine; and aromatic amines such as dibenzylamine, dimethylaniline, diphenylamine; and heterocyclic bases such as pyridine and quinaldine.

I employ the term "alkylol" in describing the invention in a general sense to include substances like monoethanolamine, diethanolamine, triethanolamine, dialkylalkylolamines, diethylethanolamine, or monoethylalkylolamine, butanolamine, pentanolamine, hexanolamine, cyclohexylethanolamine, isobutanolamine, N-phenyl ethanolamine, laurylolamine, triethanolammoniumhydroxide, also the alkylolamines of glycerine, sugar and other mono- and polyvalent alcohols, and aryl and cyclo alkylalkylolamines.

After considerable investigation, I have found it impossible up to the present time to determine the exact nature of the condensation products which I obtain. For this reason, I do not limit my invention to compounds having a specific formula, but rather to a process for producing improved hydrotropic materials and to the products resulting from such process.

It is not necessary to have the same carboxylic acid, or alkylolamine, or amine, in the reaction, but mixtures of each of these can be used. For instance, the equivalent of one molecule of a mixture of lauric and myristic acids can be condensed with the equivalent of one molecule of a mixture of mono-, di-, and triethanolamines and one molecule of butylamine or any other amine.

The condensation may advantageously be carried out in either one or a plurality of stages. In the first method, the fatty acid or similar material is mixed with the alkylolamine and amine and condensed at the proper temperature and for the proper length of time. In the second method, one mol. of alkylolamine may be first condensed with one mol. of a fatty acid or similar material and the resulting product then condensed with one or more mols of an alkylolamine, or the like, and so on. Similarly, the fatty acid and alkylolamine or the like may first be reacted after which the alkylolamine may be added and the mixture condensed.

For the benefit of those skilled in the art, I give hereinafter a number of representative examples which are by no means exhaustive, but are sufficient to teach those skilled in the art the manner in which my invention may be practiced.

Example 1

One mol. of coconut oil fatty acids is mixed with one mol. of monoethanolamine and one mol. of butylamine and the mixture heated two to four hours at a temperature of between 150 and 175° C. The resulting material is dispersible in aqueous media and soluble in organic solvents.

Example 2

One mol. of stearic acid is condensed with one mol. of diethanolamine and one mol. of dibenzylamine, the mixture being heated at approximately 150 to 170° C. for about three hours. The resulting product has good water-imbibing properties.

Example 3

One mol. of stearic acid is condensed with one mol. of diethanolamine and one mol. of tribenzylamine at a temperature of 170 to 180° C. for a few hours. The resulting product has good technical properties.

Example 4

One mol. of oleic acid, one mol. of triethanolamine, and either one or two mols of quinaldine are condensed for three hours at a temperature of 145 to 165° C. The resulting compound is dispersible in aqueous media.

Example 5

One mol. of ricinoleic acid, one mol. of monoethanolamine, and one mol. of dimethylaniline are condensed at a temperature of between 160 and 180° C. for three to four hours. The resulting product has good technical properties.

Example 6

One mol. of stearic acid is condensed with one mol. of diethanolamine and one mol. of pyridine for about four hours at approximately 150 to 170° C. The resulting product has generally the same desirable kind of characteristics as the products produced in the above examples.

Example 7

One mol. of linoleic acid is condensed with one mol. of diethanolamine and one mol. of diphenylamine at a temperature of 150 to 170° C. for three hours. A product results which disperses in water.

Example 8

One mol. of abietic acid is condensed with one mol. of triethanolamine, one mol. of benzylamine and one mol. of phenylnaphthylamine at about 200 to 220° C. for about three hours. The resulting product has good technical properties.

Example 9

One mol. of stearic acid is condensed with one mol. of glycerolamine and one mol. of ethylene diamine at about 150° C. for about three hours. A product results which has water-imbibing properties.

Example 10

One mol. of sulphonated castor oil is condensed with one mol. of diethanolamine and one mol. of triamylamine at about 160 to 170° C. for about two to three hours. The condensation product has excellent technical properties.

*Example 11*

One mol. of butanoic acid is condensed with one mol. of cyclohexylethanolamine and one mol. of aniline, employing a temperature of about 165° C. for about two to three hours. A product is obtained having very good technical properties.

In the above examples, I have tried to give a general practical idea of how the invention is practiced. I do not wish to be limited either by the examples or by other details. The examples merely illustrate the general principle that if one mol. of a fatty acid or similar material, as previously described, is condensed with one or more mols of alkylolamine and one or more mols of alkyl or arylamine, excellent properties are obtained that have many valuable technical applications.

Valuable products can also be prepared by introducing oxygenated sulphur or phosphorus groups into the molecule of my compounds. This may be accomplished by sulphating or phosphating my compounds in accordance with known practice, employing sulphuric acid, oleum, chlorsulphonic acid, phosphoric acid, $P_2O_5$, etc.

For the reasons noted above, I term the products of this reaction hydrotropic compounds, as such compounds are not only soluble or readily dispersible in water, but a water solution thereof will dissolve or disperse water-insoluble substances like fatty acids, gums and resins, both natural and synthetic. Such solutions will also disperse inorganic and organic pigments, vat dyes, etc.

Many of these substances dissolve readily also in alcohol and various organic solvents. Indeed, in some cases, they exhibit a hydrotropic action when dissolved in such media.

The compounds which can be made in accordance with my invention have a number of uses, all of which need not be mentioned here. However, I shall indicate a number of illustrative uses for the convenience of those skilled in the art.

My products will emulsify water-insoluble pigments with or without gums to form a dispersion. The products can be used in and will improve the action of paints, printing inks, etc. These products form excellent scouring preparations for wool. They may be used as emulsifying agents in water-oil emulsions. Vat dyes can be reduced with hydrosulphite and the hydrotropic fats without the presence of alkali and therefore can be used on wool, furs, etc., whereas otherwise their use is limited.

In an earlier part of the specification, I refer to temperatures at which the reaction is carried on by stating that temperatures even below 100° C. could be employed but that a temperature high enough to cause decomposition of the final product should not be used. For practical purposes, as I have already stated, any temperature between 130 and 210° C. can be used and the resulting product will have the valuable properties discussed. While the difference in temperature employed is mainly one of speed of the reaction, some slight variations in the product may be noted if wide variations of temperature are used. The temperature employed may be modified by the use of different pressure conditions. For example, if the condensation is carried out in a vacuum, much lower temperatures in many cases can be employed, and/or the heating time decreased.

While, in the various examples set forth above, I have mentioned the time involved in carrying out the condensation reaction, it will be appreciated that such may be varied depending upon the size of the batch of material treated and upon other factors. These matters, however, are readily understood by those skilled in the art. In general, the larger the batch of material being reacted, the longer time will be required to complete the reaction.

As I have stated above, my preferred results are obtained by the use of the higher fatty acids, and more particularly those having between twelve and eighteen carbon atoms in the chain. The invention, however, is not to be limited except as indicated in the claims.

Wherever the term "amine" is used in the specification or claims, unless otherwise specified it will be understood to cover compounds conventionally designated by this term and specifically excludes alkylolamines.

Wherever the term "condensation product" is employed, it will be understood to cover a reaction product among the acid, alkylolamine and amine wherein water or acid or the like is split out as a result of the union of the molecules of acid, alkylolamine and amine. Similarly, the term "condensing" is employed to cover a process wherein water or acid or the like is split out as a result of the union of the molecules of acid, alkylolamine and amine.

This application is a continuation-in-part of my prior application, Serial No. 738,688, filed August 6, 1934.

What I claim as new and desire to protect by Letters Patent of the United States is:

1. A process for producing a hydrotropic material which comprises mixing together one mol. of a higher fatty acid, at least one mol. of an alkylolamine, and at least one mol. of an amine, and heating the mixture at a temperature above 100° C. and below the temperature of decomposition of the resulting material.

2. A process for producing a hydrotropic material which comprises mixing together alkylolamine, alkylamine, and fatty acid the predominant portion of which contains between twelve and eighteen carbon atoms, there being present one mol. of fatty acid, at least one mol. of alkylolamine, and at least one mol. of alkylamine, and heating the mixture at a temperature above 100° C. and below the temperature of decomposition of the resulting material.

3. The condensation product of one molecule of a higher carboxylic acid, at least one molecule of an alkylolamine, and at least one molecule of an amine.

4. The condensation product of one molecule of a higher fatty acid, at least one molecule of an alkylolamine, and at least one molecule of an alkylamine.

5. The condensation product produced by reacting one mol. of a higher fatty acid with at least one mol. of alkylolamine and at least one mol. of amine at a temperature between 100 and 300° C.

6. The condensation product of one mol. of a higher fatty acid, at least one mol. of alkylolamine, and at least one mol. of arylamine.

7. The condensation product of one mol. of coconut oil fatty acids, at least one mol. of alkylolamine, and at least one mol. of alkylamine.

8. The condensation product of one mol. of coconut oil fatty acids, one mol. of monoethanolamine, and one mol. of alkylamine.

9. The condensation product of one mol. of stearic acid, at least one mol. of alkylolamine, and at least one mol. of amine.

10. The condensation product of one mol. of stearic acid, one mol. of diethanolamine, and at least one mol. of amine.

11. The condensation product of at least one mol. of an alkylolamine, at least one mol. of amine, and one mol. of fatty acids of the group consisting of stearic, oleic, lauric, myristic, linoleic, palmitic, ricinoleic, coconut oil fatty acids, and mixtures thereof.

12. The condensation product of at least one mol. of alkylolamine, one mol. of organic carboxylic acid, and at least one mol. of alkylamine.

13. The condensation product of one mol. of a higher unsaturated fatty acid, at least one mol. of a mixture of alkylolamines, and at least one mol. of amine.

14. The condensation product of a mixture of at least one mol. of alkylolamine, one mol. of a higher organic monobasic carboxylic acid, and at least one mol. of amine.

15. The condensation product of one mol. of oleic acid, one mol. of an alkylolamine, and at least one mol. of amine.

16. A process for producing hydrotropic materials which comprises mixing together at least one mol. of alkylolamine with one mol. of higher fatty acid, and at least one mol. of alkylamine, and heating the mixture at a temperature of about 100° C. or higher but below the temperature of decomposition of the resulting hydrotropic material to effect a condensation among the alkylolamine, higher fatty acid, and alkylamine.

17. The process of claim 16, wherein the higher fatty acid is a member of the class consisting of stearic, oleic, lauric, myristic, linoleic, palmitic, ricinoleic, coconut oil fatty acids, and mixtures thereof.

18. A process for producing hydrotropic material which comprises mixing together at least one mol. of alkylolamine with one mol. of higher organic carboxylic acid and at least one mol. of amine, and heating the mixture at a temperature of about 100° C. or higher but below the temperature of decomposition of the resulting hydrotropic material to effect a condensation among the alkylolamine, higher organic carboxylic acid, and amine.

19. The condensation product of at least one mol. of alkylolamine, at least one mol. of amine, and a member of the group consisting of higher carboxylic acids, their esters, halides, amides, and anhydrides, there being present approximately one mol. of carboxylic acid in said condensation product.

20. The condensation product of at least one mol. of alkylolamine, at least one mol. of amine, a member of the group consisting of higher fatty acids, their esters, halides, amides, and anhydrides, there being present approximately one mol. of higher fatty acid in said condensation product.

21. The condensation product of claim 19 wherein the amine is an alkylamine.

22. The condensation product of claim 20 wherein the amine is an alkylamine.

WOLF KRITCHEVSKY.